United States Patent
Han et al.

(10) Patent No.: US 10,506,527 B2
(45) Date of Patent: Dec. 10, 2019

(54) MECHANISM FOR ENHANCING POWER CONTROL IN TIME DIVISION BASED COMMUNICATIONS

(71) Applicant: AVAGO TECHNOLOGIES INTERNATIONAL SALES PTE. LIMITED, Singapore (SG)

(72) Inventors: Jing Han, Beijing (CN); Chunyan Gao, Beijing (CN); Haiming Wang, Beijing (CN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 233 days.

(21) Appl. No.: 14/858,817

(22) Filed: Sep. 18, 2015

(65) Prior Publication Data

US 2016/0044603 A1 Feb. 11, 2016

Related U.S. Application Data

(63) Continuation of application No. 14/130,592, filed as application No. PCT/CN2011/076865 on Jul. 5, 2011, now Pat. No. 9,143,308.

(51) Int. Cl.
*H04W 52/24* (2009.01)
*H04W 52/14* (2009.01)
*H04W 52/22* (2009.01)
*H04L 5/14* (2006.01)

(52) U.S. Cl.
CPC ......... *H04W 52/243* (2013.01); *H04L 5/1469* (2013.01); *H04W 52/14* (2013.01); *H04W 52/146* (2013.01); *H04W 52/226* (2013.01); *H04W 52/247* (2013.01)

(58) Field of Classification Search
CPC .. H04L 5/1469; H04W 72/082; H04W 52/14; H04W 52/243
See application file for complete search history.

(56) References Cited

U.S. PATENT DOCUMENTS

| 9,143,308 B2 * | 9/2015 | Han | H04W 52/146 |
| 2011/0149813 A1 | 6/2011 | Parkvall et al. | |
| 2011/0176461 A1 | 7/2011 | Astely et al. | |
| 2011/0235582 A1 | 9/2011 | Chen et al. | |

(Continued)

FOREIGN PATENT DOCUMENTS

| CN | 101873686 A | 10/2010 | |
| CN | 102064879 A | 5/2011 | |
| WO | WO 2009129698 | * 10/2009 | H04W 52/04 |

*Primary Examiner* — Zhensheng Zhang
(74) *Attorney, Agent, or Firm* — Xsensus, LLP

(57) ABSTRACT

There is provided a mechanism for conducting power control in a time division based communication. Subframes of a frame structure of the time division based communication are classified into at two or more classification sets, each classification set comprising at least one subframe. For each of the classification sets, power control related parameters are selected in accordance with the interference on the respective subframes. On the basis of the selected power control related parameters, a power control parameter set is configured defining a power control setting for each subframe of the frame structure. A UE receiving the power control parameter set applies the power control related parameters in the power control.

18 Claims, 6 Drawing Sheets

(56) References Cited

U.S. PATENT DOCUMENTS

2011/0267994 A1* 11/2011 Pan ..................... H04W 52/08
370/280
2012/0008707 A1 1/2012 Kim et al.
2012/0282970 A1 11/2012 Kela et al.
2013/0329612 A1 12/2013 Seo et al.

* cited by examiner

MECHANISM FOR ENHANCING POWER CONTROL IN TIME DIVISION BASED COMMUNICATIONS

CROSS-REFERENCE TO RELATED APPLICATIONS

The present application is a continuation application of and claims the benefit of priority under 35 U.S.C. § 120 from U.S. Ser. No. 14/130,592, filed Jan. 2, 2014, the entire contents of which is incorporated herein by reference and which is a national stage of International Application No. PCT/CN2011/076865, filed Jul. 5, 2011.

BACKGROUND OF THE INVENTION

Field of the Invention

The present invention relates to a mechanism for enhancing power control in communication networks. In particular, the present invention is related to apparatuses, methods and computer program products providing a mechanism by means of which an improved power control in time division based communication networks, such as a local area time division duplex network is provided for enabling more flexible and efficient transmission power settings for communication network elements like UEs in the local area.

Related Background Art

Prior art which is related to this technical field can e.g. be found by the technical specification 3GPP TS 36.213, for example according to version 10.2.0.

The following meanings for the abbreviations used in this specification apply:

DL: downlink
DwPTS: downlink pilot time slot
eNB: evolved node B
E-UTRAN: evolved universal terrestrial radio access network
FDD: frequency division duplex
GP: guard period
LA: local area
LTE: Long Term Evolution
LTE-A: LTE Advanced
MCS: modulation and coding scheme
PC: power control
PDCCH: physical downlink control channel
PRACH: physical random access channel
PRB: physical resource block
PUCCH: physical uplink control channel
PUSCH: Physical Uplink Shared Channel
RNTI: radio network temporary identifier
RRC: radio resource control
SF: subframe
SRS: sounding reference symbol
TDD: time division duplex
TPC: transmission power control
Tx: transmitter
UE: user equipment
UL: uplink
UpPTS: uplink pilot time slot
UTRAN: Universal Terrestrial Radio Access Network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments. Examples for new communication technologies are for example LTE and LTE-A of 3GPP.

For example, in LTE represent is the next evolution of 3GPP based communication technology high data rates the DL and UL direction as well as reduced latency for packet transmissions is tried to be achieved. For this purpose, orthogonal frequency division multiple access (OFDMA) is the multiple access method used in the DL direction while in the UL direction single-carrier frequency division multiple access (SD-FDMA) mode is used. There are two different duplex modes for separating the transmission directions from the user to the base station and vice versa: on is frequency division duplex (FDD) and the other is time division duplex (TDD). In the case of FDD, the downlink and uplink are transmitted using different frequencies. In the TDD mode, the DL and UL are on the same frequency and the separation occurs in the time domain, so that each direction in a call is assigned to specific timeslots. The TDD mode is used for transmissions in unpaired frequency bands.

Both the uplink and downlink for LTE are divided into radio frames of a specific length (e.g. 10 ms). A frame consists of two "half-frames" of equal length, with each half-frame consisting of e.g. 10 slots, wherein two consecutive slots form one subframe. TDD may uses the same frequency bands for the uplink and the downlink. The transmission directions are separated by carrying the UL and DL data in different subframes. The distribution of subframes between the transmission directions can be adapted to the data traffic and is done either symmetrically (equal number of DL and UL subframes) or asymmetrically.

Assymetric distribution of subframes may be employed, for example, in LTE-A systems, such as TDD systems in a LA scenario (LA TDD). For example, the asymmetric resource allocation in LTE TDD is realized by providing seven different semi-statically configured uplink-downlink configurations defining a respective number and order of UL subframes and DL subframes in the transmission frame. Due to these different configurations, it is possible to provide between 40% and 90% DL subframes which allows a certain flexibility in the resource allocation in the LA TDD network.

For TDD deployments in general, interference between UL and DL including both basestation-to-basestation and UE-to-UE interference is typically handled by statically providing a guard period and adopting the same frame timing and uplink-downlink configuration practically in the entire network. However, in an LA network, the interference between UL and DL may occur again since it may be of interest to consider different UL/DL allocations in the neighbouring cells. This is because a same DL/UL configuration in different neighboring cells of the LA network may not match the traffic situation in the different LA cells having generally a small number of users. However, in order to handle such an interference, it is necessary to conduct a suitable power control, so that this may have a heavy impact on the transmission power settings for a UE in the LA network.

Also the DL-UL interference in multi-cell scenarios is to be considered. As a result, an interference level between different subframes of the same frame may be significantly different.

SUMMARY OF THE INVENTION

It is an object of the invention to provide an improved mechanism for conducting power control in a TDD based network so as to enable more flexible and efficient transmission power settings for the UEs. In particular, it is an object of the present invention to provide an apparatus, method and computer program product by means of which power control related parameters can be configured in such a manner that a more flexible power control of subframes is provided for matching the different interference scenarios in a LA TDD network.

These objects are achieved by the measures defined in the attached claims.

According to an example of an embodiment of the proposed solution, there is provided, for example, an apparatus comprising a classifying processing portion configured to classify subframes of a frame structure of a time division based communication into at least two different classification sets, each classification set comprising at least one subframe, a selecting processing portion configured to select separately for each of the at least two classification sets at least one power control related parameter, and a configuration processing portion configured to configure on the basis of the selected power control related parameters a power control parameter set defining a power control setting for each subframe of the frame structure.

Furthermore, according to an example of an embodiment of the proposed solution, there is provided, for example, a method comprising classifying subframes of a frame structure of a time division based communication into at least two different classification sets, each classification set comprising at least one subframe, selecting separately for each of the at least two classification sets at least one power control related parameter, and configuring on the basis of the selected power control related parameters a power control parameter set defining a power control setting for each subframe of the frame structure.

Moreover, according to a further example of an embodiment of the proposed solution, there is provided, for example, an apparatus comprising a receiver configured to receive a power control parameter set defining a power control setting for subframe of a frame structure of a time division based communication, a determining processing portion configured to determine from the power control parameter set at least one power control related parameter for each subframe, wherein the determination is based on a classification of the subframes into at least two different classification sets, each classification set comprising at least one subframe, and an applying processing portion configured to apply the determined power control related parameter in a power control for a communication in each subframe.

Furthermore, according to an example of an embodiment of the proposed solution, there is provided, for example, a method comprising receiving a power control parameter set defining a power control setting for subframe of a frame structure of a time division based communication, determining from the power control parameter set at least one power control related parameter for each subframe, wherein the determination is based on a classification of the subframes into at least two different classification sets, each classification set comprising at least one subframe, and applying the determined power control related parameter in a power control for a communication in each subframe.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an apparatus, method and computer program product by means of which a more flexible power control of subframes is provided for matching the different interference scenarios in a LA TDD network. For example, it is possible to cope with complex interference status in LA TDD networks (i.e. different interference levels between fixed subframe and flexible subframe, as well as among flexible subframes). Furthermore, a power control procedure can be provided, which may be employed for example in an enhanced LA TDD network, which allows handling of hopping interference levels between different subframes, e.g. flexible subframes and fixed subframes, as well as among flexible subframes, i.e. which allows a suitable power control reacting on varying interferences. Moreover, the proposed mechanism can be easily implemented and has only a limited impact on current specifications.

The above and still further objects, features and advantages of the invention will become more apparent upon referring to the description and the accompanying drawings.

DESCRIPTION OF PREFERRED EMBODIMENTS

Figure 1:
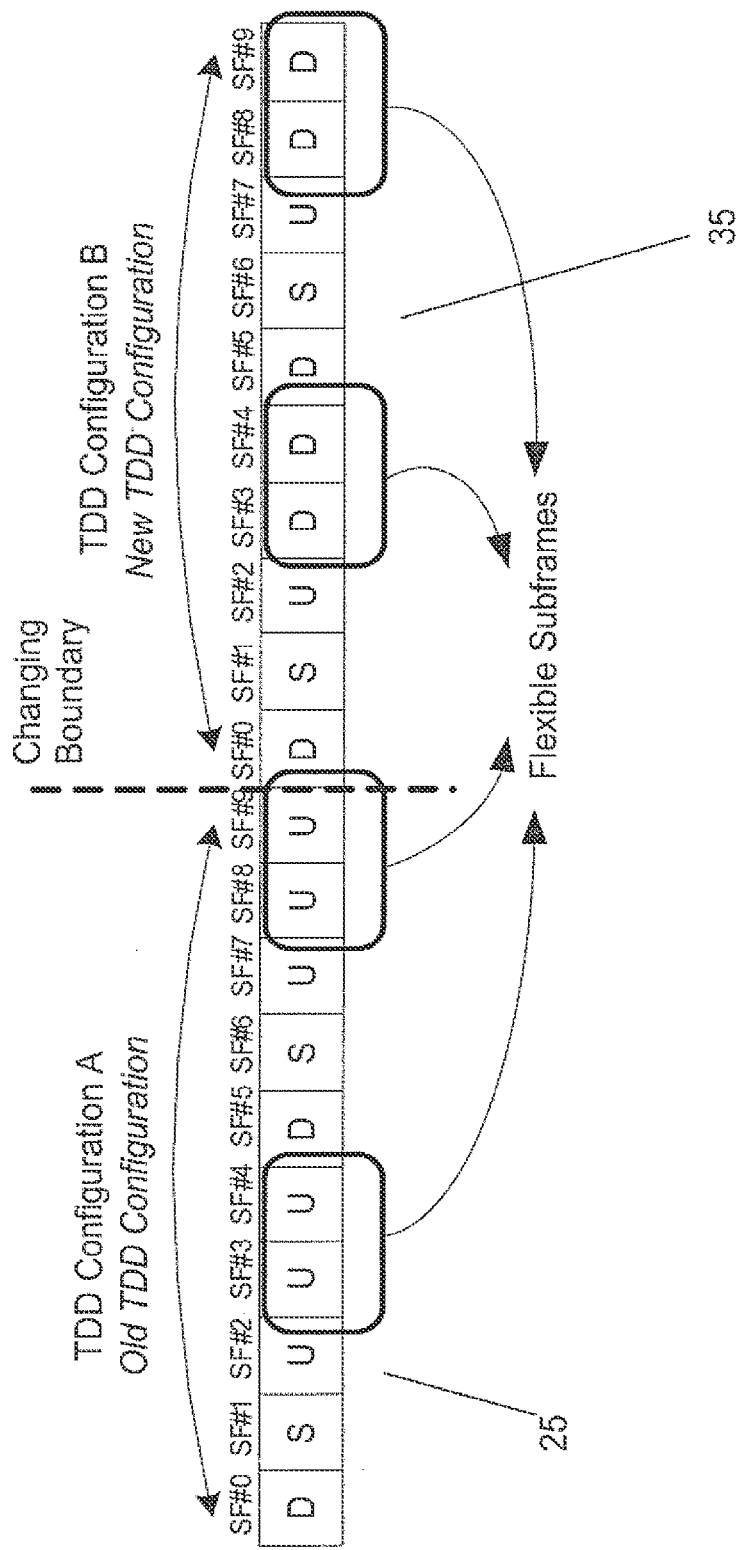
FIG. 1 shows a diagram illustrating a frame structure comprising flexible and fixed subframes.

In the following, examples and embodiments of the present invention are described with reference to the drawings. For illustrating the present invention, the examples and embodiments will be described in connection with a cellular communication network based on a 3GPP LTE-A system, in particular a LTE-A LA TDD network. However, it is to be noted that the present invention is not limited to an application using such types of communication system, but is also applicable in other types of communication systems and the like.

A basic system architecture of a communication network may comprise a commonly known architecture of a communication system comprising a wired or wireless access network subsystem and a core network. Such an architecture may comprise one or more access network control elements, radio access network elements, access service network gateways or base transceiver stations, such as a base station (BS) or eNB, with which a communication network element or device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like are usually comprised.

The general functions and interconnections of the described elements, depending on the actual network type, are known to those skilled in the art and described in corresponding specifications so that a detailed description thereof is omitted herein. However, it is to be noted that several additional network elements and signaling links may be employed for a communication connection to or from UEs or eNBs, besides those described in detail herein below.

Furthermore, the described network elements, such as communication network elements like UEs or communication network control elements like base stations or eNBs, and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

First, a principle configuration of a frame structure used in a communication of for example an LA TDD network in which examples of embodiments of the invention are implementable is described in connection with FIG. 1.

As indicated above, a TDD configuration of an LA TDD network may be dynamically changed to match the current traffic situation of LA TDD UEs. In other words, in order to deal with changing UL or DL traffic, the TDD configuration may be dynamically changed. For this purpose, for example, there may be provided different TDD configurations. In these different TDD configurations, there are basically two kinds of subframes in the frame structure: a fixed subframe which is fixedly preconfigured as one of a DL subframe or UL subframe, and a flexible subframe which is dynamically assigned to become an DL subframe at one time and an UL subframe at another time.

FIG. 1 shows a corresponding example of a frame structure in a TDD network. Specifically, reference sign 25 denotes a frame having 10 subframes (SF#0 to SF#9), wherein "D" means that DL data is transmitted in this subframe, "U" indicates UL data transmission and "S" specifies that special fields (i.e. DwPTS, GP and UpPTS) are transmitted in this subframe. The frame 25 is configured according to a first TDD configuration A. When a change of the frame is required, e.g. due to a changing traffic load, the frame structure is changed to another TDD configuration, for example to a second TDD configuration B shown at reference sign 35, which also comprises the ten subframes. However, as indicated above, there are subframes which are fixed, i.e. which are never changed, and subframes which are flexible, i.e. which can be changed. In the example shown in FIG. 1, subframes SF#3, SF#4, SF #8 and SF#9 are flexible, i.e. they are changed from UL subframes in the old TDD configuration to DL subframes in the new TDD configuration. However, it is to be noted that basically more or less than these four subframes may be changed, i.e. represent flexible subframes, and the change may also be vice versa, i.e. from DL to UL.

Figure 2:
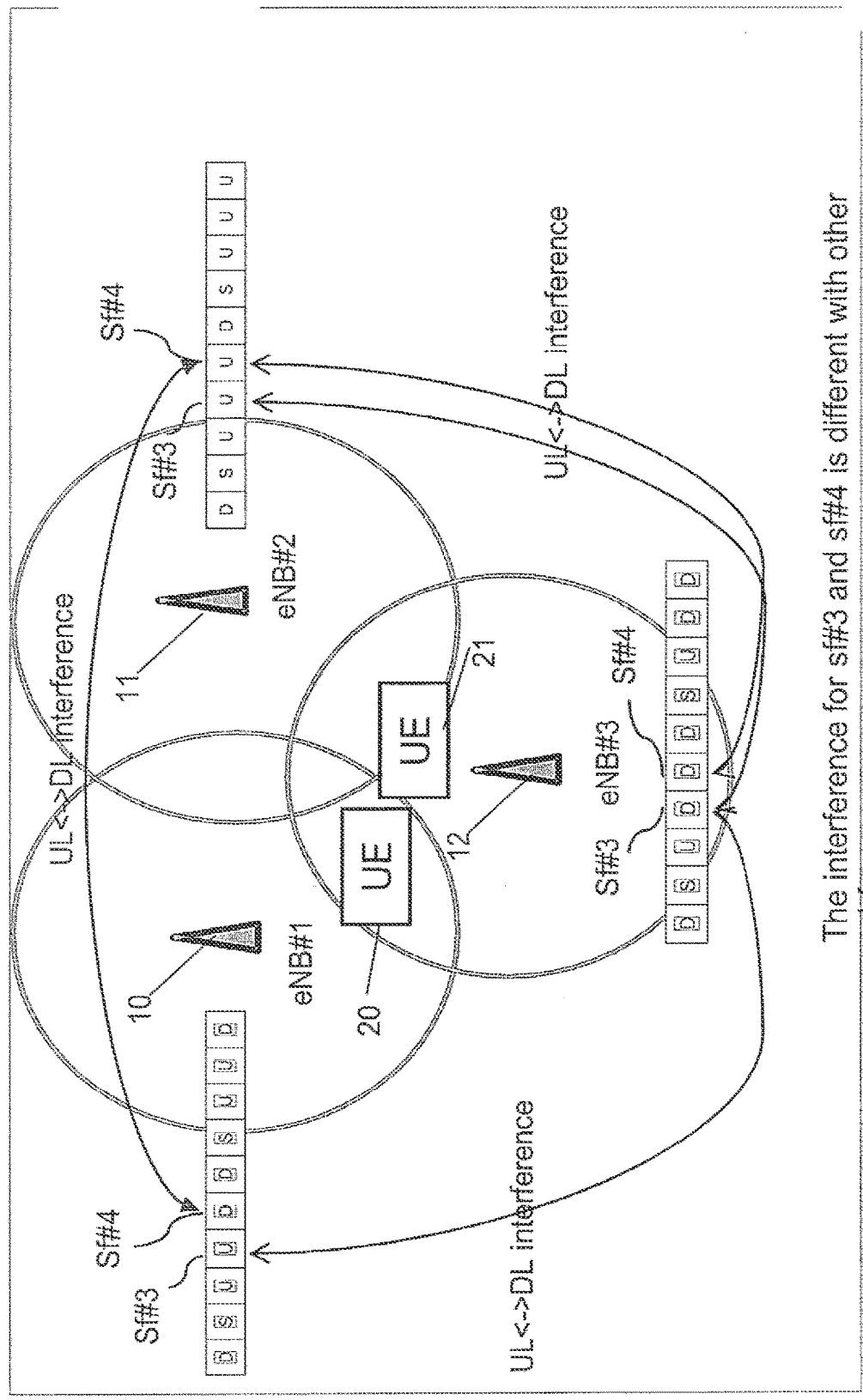
FIG. 2 shows a diagram illustrating interference scenarios in a network using a communication based on frames as shown in FIG. 1.

FIG. 2 shows a diagram illustrating interference scenarios in a network using a communication based on frames as shown in FIG. 1. Specifically, FIG. 2 is related to a multi-cell scenario with plural cells served by eNBs 1 to 3, denoted with reference signs 10 to 12. For each of the cells, as one corresponding example, a frame structure being similar to that explained in connection with FIG. 1 is depicted illustrating the current setting of the subframes. In the figure, SF#3 and SF#4 are highlighted which represent flexible subframes. Furthermore, a UEs 20 and 21 are shown which conduct communication in the multi-cell network.

Due to the dynamic changing of the flexible subframes and the different TDD configurations being possible present in neighboring cells, the interference status of flexible subframe and fixed subframe may be very different. For fixed subframes, since the subframe direction (UL/DL) of neighboring cells are all the same, a stable interference level can be expected (similar to a legacy LTE TDD network). However, for the flexible subframe, there may be a possible UL-DL interference between neighboring cells, and the interference level has to be expected significantly larger than for the fixed subframes. In addition, when considering the flexible subframes alone, the interference level is also different, since the interference could be DL-to-UL interference, or UL-to-DL interference, and the number of interference sources may be variable.

FIG. 2 illustrates this situation. As indicated in FIG. 2, when looking e.g. on eNB#1 10, SF#3 and SF#4 are flexible subframe. Due to the DL-UL interference, the interference levels for SF#3 and SF#4 are different with that of other subframes for eNB#1. Furthermore, since SF#3 suffers interference from the DL subframe of eNB#3 12, and SF#4 suffers interference from UL subframe of eNB#2 11, the interference status of SF#3 and the interference status of SF#4 are also different.

Thus, due to the variable interference differences between flexible subframe and fixed subframes, and even among flexible subframes, power control of UE is to be designed such that it can be adapted to the interference differences e.g. in an enhanced LA TDD network. According to examples of embodiments of the invention, a mechanism is provided which enables flexible transmission power settings for the UEs so as to cope with the different and variable interferences caused by the flexible subframes, for example.

Conventionally, in a PC scheme, only one set of PC parameters is semi-statically configured which is sufficient when the interference level of all subframes is same.

For example, in an LTE-A based network, it is assumed in the following that a transmission power calculation based on the 3GPP LTE E-UTRAN principles is used, for example according to specification 3GPP TS 36.213, version 10.2.0 (which represent only one of plural possible example algorithms applicable in connection with examples of embodiments of the invention). Then, a transmission power for a subframe i where PUSCH/PUCCH/SRS transmission should happen may be calculated according to the following formulas.

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm] \quad (1)$$

In this equation (1), $P_{CMAX,c}$ is a configured UE transmitted power (maximum power); $M_{PUSCH,c}(i)$ is the bandwidth of the PUSCH resource assignment expressed in number of resource blocks valid for subframe i; $P_{O\_PUSCH}(j)$ is a parameter composed of the sum of a cell specific nominal component $P_{O\_NOMINAL\_PUSCH,c}(j)$ provided from higher layers and a component $P_{O\_UE\_PUSCH,c}(j)$ provided by higher layers; for j=0 or 1, $\alpha_c \in \{0, 0.4, 0.5, 0.6, 0.7, 0.8, 0.9, 1\}$ is a 3-bit cell specific parameter provided by higher layers (for j=2, $\alpha(j)=1$); $PL_c$ is the downlink pathloss estimate calculated in the UE in dB; $\Delta_{TF}(i)$ is a further parameter representing a modulation and coding scheme (MCS) dependent component (delta value for different MCS); and $f_c(i)$ represents a current power control adjustment state accumulated from received TPC commands (e.g. $f_c(i)=f_c(i-1)+\delta_{PUSCH,c}(i-K_{PUSCH})$ if accumulation is enabled, wherein is a correction value, also referred to as a TPC command, and $K_{PUSCH}$ is a constant depending on the transmission type).

The setting of the transmit power $P_{PUCCH,c}$ for the physical uplink control channel (PUCCH) transmission in subframe i or for the transmit power $P_{SRS,c}$ may be computed in a similar manner wherein other parameters are included. As there are many different ways of calculating these transmit powers, which are known to those skilled in the art, a further explanation thereof is omitted here.

TPC command that related to $f_c$ is adapted to adjust the UE transmission power in a predefined range according to configured PC mode: accumulated mode or absolute mode. The accumulated mode has smaller adjusted ranges of one TPC command but the adjusted transmission power could be accumulated to form a large range. However, using conventional TPC command with accumulated mode to change the transmission power to another level is a slow procedure, and a "jump" to different interference level between flexible subframe and fixed subframe is difficult to be achieved. On the other hand, TPC commands with absolute mode could adjust transmission power in a larger range in one time, but the maximum adjusted transmission power is limited, for example, to 4 dB, which is also illustrated in following table 1.

TABLE 1

TPC command value of accumulated mode and absolute mode

| TPC Command Field in DCI format 0/3 | Accumulated $\delta_{PUSCH,c}$ [dB] | Absolute $\delta_{PUSCH,c}$ [dB] only DCI format 0 |
|---|---|---|
| 0 | −1 | −4 |
| 1 | 0 | −1 |
| 2 | 1 | 1 |
| 3 | 3 | 4 |

However, an absolute mode is not applicable for all types of channels, and even if it is applicable, the achievable adjustment is 4 dB which may not be sufficient as the adjusted transmission power can not be accumulated.

Thus, according to examples of embodiments of the invention, a power control procedure is provided which is usable, for example, in an enhanced LA TDD network with a frame structure as discussed above, where it is possible to cope with hopping interference levels between flexible subframe and fixed subframe, as well as among flexible subframes.

For example, referring back to the calculation of the transmission power for PUSCH described above, conventionally, $P_{O\_PUSCH}$ and $\alpha_c$ are semi-statically configured and they are same for all subframes. According to examples of embodiments of the invention, these power control parameters (and also other parameters) are set independently and dynamically for each subframe or group of subframe (classification set) so that the different interference levels on respective subframes can be coped with.

For achieving this, according to one example of embodiments of the invention, in order to set power control parameters to cope with the differing interference scenarios, power control related parameters are configured based on subframe index. That is, when using as power control related parameters for an example one or more of $P_{O\_UE\_PUSCH}$ in a PUSCH power control, and/or a parameter $P_{O\_UE\_PUCCH}$ in PUCCH power control and/or a parameter $P_{SRS\_OFFSET}$ for SRS power control (which basically correspond to $P_{O\_UE\_PUSCH}$ in the PUSCH power control according to equation (1)), and a parameter for enabling or disabling a processing mode for accumulating transmission power control command values, for example for enabling an accumulation of TPC commands (e.g. a parameter accumulation-enabled), then these parameters are configured based on a subframe index (e.g. SF#0 . . . SF#9, as indicated in FIG. 1). In other words, a classification of subframes into several sets may be conducted, so that e.g. all subframes being fixed subframes are put into one set while each subframe being a flexible subframe is put into its own set. Then, to each of these sets, power control related parameters are allocated, and the power control parameter set can be configured by sequence based RRC parameters.

Alternatively or additionally, according to another example of embodiments of the invention, in order to set power control parameters to cope with the differing interference scenarios, power control related parameters are configured based on a predefined rule to divide the subframes into groups. For example, when using again the parameters $P_{O\_UE\_PUSCH}$ in PUSCH power control, $P_{O\_UE\_PUCCH}$ in PUCCH power control, and $P_{SRS\_OFFSET}$ for SRS power control, as well as the parameter accumulationenabled, the parameters are divided by groups to be specified and configured by RRC. In other words, a classification of subframes into several sets may be conducted, wherein one set represent one group divided on the basis of the rule. For example, groups may be divided according to an interference category (e.g. U-U interference group of subframes and U-D interference group of subframes), or according to the kind of subframe (e.g. one group for all flexible subframes and one group for all fixed subframes). Then, to each of these sets or groups, power control related parameters are allocated, and the power control parameter set can be configured by sequence based RRC parameters.

According to a further example of embodiments of the invention, when receiving a power control parameter set as configured according to one of the above examples, a receiving UE is configured to apply the power related parameters for each subframe i in an UL transmission (on PUSCH, PUCCH, SRS) according to the RRC subframe index/group based configuration. In other words, the UE is able to determine from the sequence of the received power control parameter set the correct power control parameter value to be used for the specific subframe i, based on the classification thereof.

According to a still further example of embodiments of the invention, when accumulation mode for the adjustment of the transmission power (TPC commands) is enabled for specific subframes, the TPC related parameter in the power control equation will be updated separately based on different subframe/group that is configured by RRC. For example, a TPC related parameter is updated for fixed subframe independently, and a TPC related parameter is updated for each flexible subframe e.g. with different configured $P_O$ value independently.

Next, a processing for implementing the above described examples of embodiments of the invention, which is conducted by the communication network control element (eNB 10, for example) and the communication network element (UE 20, for example), respectively, is described with reference to FIGS. 3 and 4.

Figure 3:
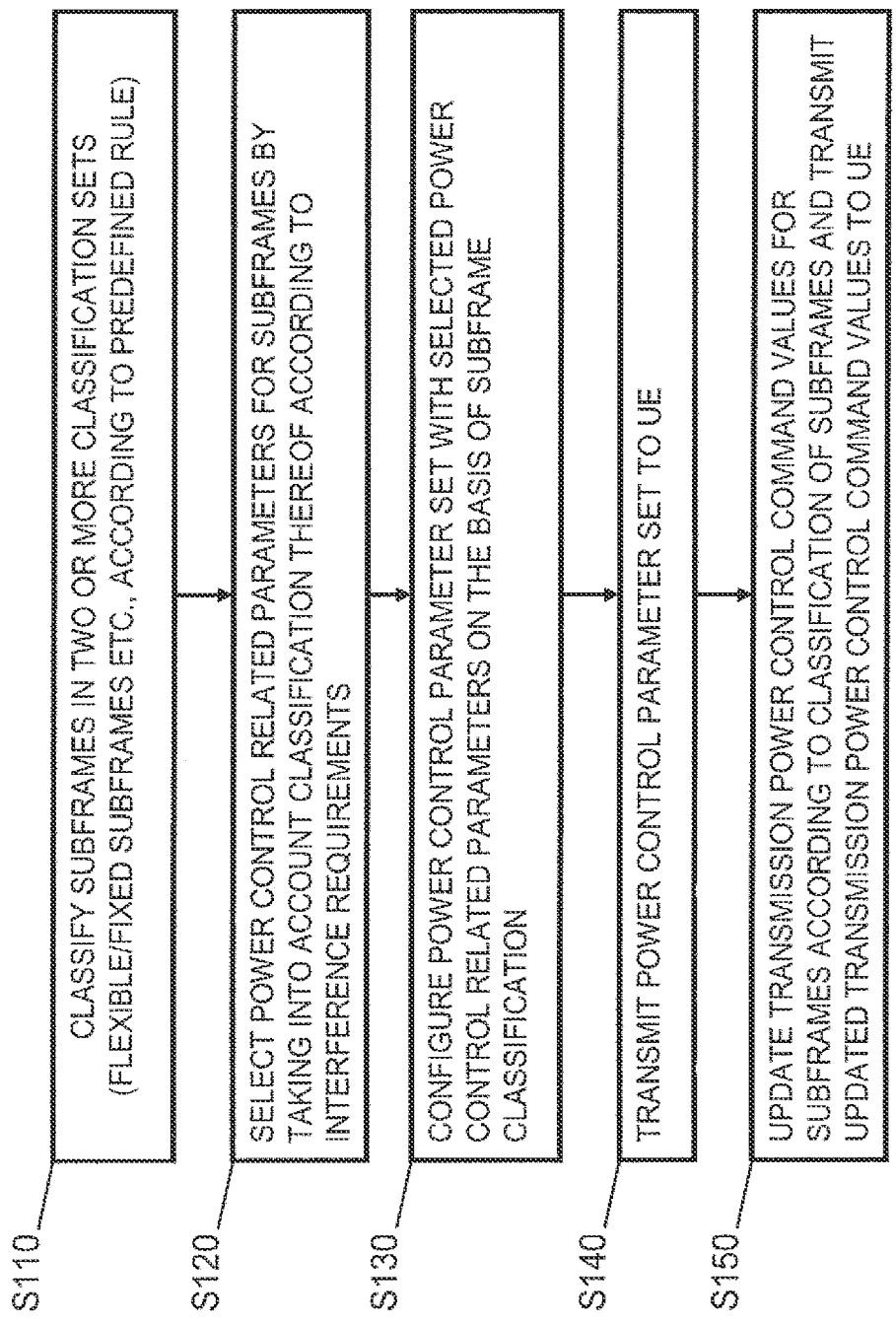
FIG. 3 shows a flowchart illustrating a processing executed in a communication network control element like a base station or eNB in a procedure according to an example of embodiments of the invention.

Specifically, in FIG. 3, the processing executed by the eNB 10 is described.

In step S110, for allocating power control related parameters in a desired manner, the subframes of the frame structure of the TDD based network are classified into two or more sets (also referred to as classification sets), wherein each set comprises at least one subframe. That is, for example, the subframes are classified as fixed subframes to which the same power control related parameter is allocated, and as flexible subframes to which either a separate common power control related parameter or plural other power control related parameters is/are allocated.

Then, in step S120, for each set of subframes (e.g. flexible and fixed subframes), at least one power control related parameter is selected and assigned. For example, values for $P_{O\_UE\_PUSCH}$ in PUSCH power control, $P_{O\_UE\_PUCCH}$ in PUCCH power control, and $P_{SRS\_OFFSET}$ for SRS power control, as well as the parameter accumulationenabled are correspondingly selected, e.g. based on interference calculations or the like so as to cope with the interference on the respective subframes.

Then, in step S130, on the basis of the selected power control related parameters, a power control parameter set is configured which defines a power control setting for each subframe of the frame structure. For example, a sequence defining the power control related parameters in an order corresponding to the classification sets is formed for configuring the power control parameter set.

In step S140, the power control parameter set configured in step S130 is sent to a communication network element, e.g. UE 20.

Furthermore, the processing in the eNB 10 may comprise a step S150 where parameter related to the TPC command is updated for specific subframes, as discussed above, and the updated TPC commands are sent to the UE 20, for example.

Figure 4:
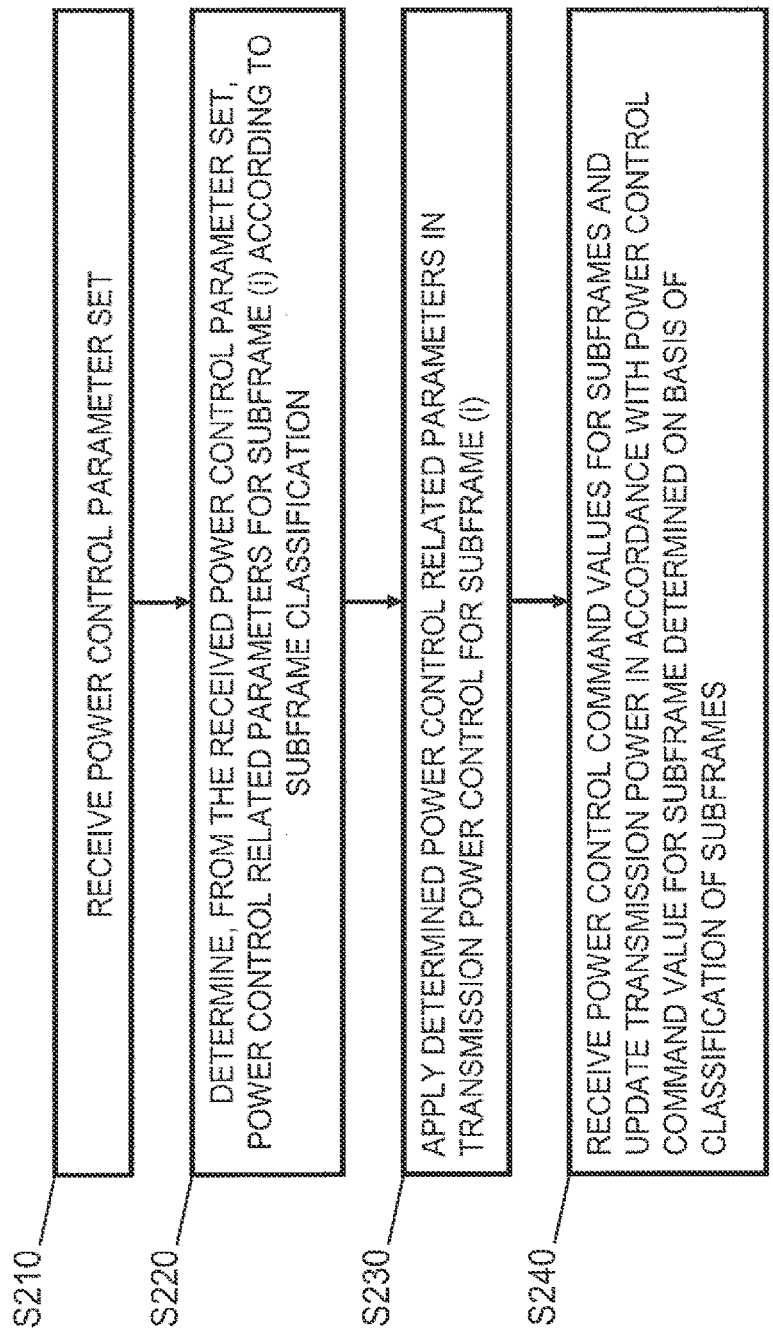
FIG. 4 shows a flowchart illustrating a processing executed in a communication network element like a UE in a procedure according to an example of embodiments of the invention.

On the other hand, in FIG. 4, the processing executed by the UE 20 is described.

In step S210, the UE 20 receives the power control parameter set (as sent e.g. in step S140 in FIG. 3) which defines the power control setting for subframes of the frame structure.

In step S220, the UE 20 determines from the received power control parameter set the power control related parameter for each subframe (e.g. $P_{O\_UE\_PUSCH}$ for PUCCH power control, $P_{O\_UE\_PUCCH}$ for PUCCH power control, $P_{SRS\_OFFSET}$ for SRS power control, value for accumulationenabled). In this determination, the power control related parameters selected for a subframe according its classification (e.g. for fixed subframes, for flexible subframe(s), etc.) are excised from the power control parameter set accordingly, for example on the basis of the sequence order of parameters and a corresponding mapping to the correct subframe (or subframe type).

In step S230, the determined power control related parameters are applied in a power control for a communication in each subframe.

Furthermore, the processing in the UE 20 may comprise a step S240 where updated TPC commands are received, for example, and where it is determined which of the received transmission power control command values is to be used for which subframe, that is a change amount for a transmission power of a respective subframe is calculated by using the TPC command on the basis of the classification of the subframes into the classification sets.

In the following, an implementation of examples of embodiments of the invention is described, wherein the basic system architecture may correspond to that shown in FIG. 2, for example.

As described above, according to examples of embodiments of the invention, instead of using only one set of PC parameters in the power control, there are provided multiple sets of PC parameters which can be utilized for respective subframes according to a classification thereof, for example.

More specifically, according to examples of embodiments of the invention, PC parameters that are conventionally semi-statistical and thus not suitable to cope with the differing interference scenarios, are configured based on a subframe index or group, so that for example each subframe/group has one PC parameter settings wherein the subframe/group setting is defined via RRC signaling.

For example, $P_{O\_UE\_PUSCH}$, $P_{O\_UE\_PUCCH}$ and $P_{SRS\_OFFSET}$ may be configured based on subframe index/group, as described above. Due to the different interference levels between flexible subframes and fixed subframes, as well as different interference levels among flexible subframes, one set PC parameter could be configured for fixed subframes and one set PC parameter could be configured for each flexible subframe.

In the following, an implementation example for an RRC signaling design in a pseudo-code manner is provided:

```
-- ASN1START
UplinkPowerControlDedicated ::=          SEQUENCE {
p0-UE-PUSCH                                   INTEGER (-8..7),
deltaMCS-Enabled                              ENUMERATED {en0, en1},
accumulationEnabled                           BOOLEAN,
p0-UE-PUCCH                                   INTEGER (-8..7),
pSRS-Offset                                   INTEGER (0..15),
filterCoefficient                             FilterCoefficient    DEFAULT fc4
}
UplinkPowerControlDedicated-r11 ::=      SEQUENCE {
p0-UE-PUSCHList                               p0-UE-PUSCHList,
deltaMCS-Enabled                              ENUMERATED {en0, en1},
accumulationEnabled                           BIT STRING (SIZE(7)),
p0-UE-PUCCHList                               p0-UE-PUCCHList,
pSRS-OffsetList                               pSRS-OffsetList
filterCoefficient                             FilterCoefficient    DEFAULT fc4
}
p0-UE-PUSCHList ::=         SEQUENCE (SIZE (1..7)) OF INTEGER (-8..7)
p0-UE-PUCCHList ::=         SEQUENCE (SIZE (1..7)) OF INTEGER (-8..7)
pSRS-OffsetList ::=         SEQUENCE (SIZE (1..7)) OF INTEGER (0..15)
-- ASN1STOP
```

For explaining the implementation of the examples of embodiments of the invention, the following parts are further explained:

p0-UE-PUSCHList
accumulationEnabled
p0-UE-PUCCHList
pSRS-OffsetList

Regarding the part p0-UE-PUSCHList, this is related to the parameter $P_{O\_UE\_PUSCH}(1)$ according to equation (1) and has a unit [dB]. For example, this part is applicable for non-persistent scheduling, only.

When, according to one of the above examples of embodiments of the invention, the power control parameters are configured on the basis of a subframe index, then it is possible to implement this in the above signaling design by using the first value of p0-UE-PUSCHList for subframes SF#0, SF#1, SF#5, SF#6 (fixed subframes in LA TDD), by using the second value thereof for subframe SF#2; by using the third value thereof for subframe SF#3, by using the fourth value thereof for subframe SF#4, by using the fifth value thereof for subframe SF#7, by using the sixth value thereof for subframe SF#8, and by using the seventh value thereof for subframe SF#9. On the other hand, when, according to one of the above examples of embodiments of the invention, the power control parameters are configured on the basis of a predefined rule (grouping of subframes), then it is possible to implement this in the above signaling design by using the size of the sequence as the group number, wherein the first value is used for group 1 (e.g. fixed subframes), and the second value is used for group 2 (e.g. flexible subframes), etc. It is to be noted that the size is not limit to value of 7.

Regarding the part accumulationEnabled, this is related to the setting parameter for enabling or disabling the accumulation mode. A value of TRUE corresponds to "enabled" whereas a value of FALSE corresponds to "disabled".

Similar to the above part p0-UE-PUSCHList, when, according to one of the above examples of embodiments of the invention, the power control parameters are configured on the basis of a subframe index, then it is possible to implement this in the above signaling design by using the first value of accumulationEnabled for subframes SF#0, SF#1, SF#5, SF#6 (fixed subframes in LA TDD), by using the second value thereof for subframe SF#2; by using the third value thereof for subframe SF#3, by using the fourth value thereof for subframe SF#4, by using the fifth value thereof for subframe SF#7, by using the sixth value thereof for subframe SF#8, and by using the seventh value thereof for subframe SF#9. On the other hand, when, according to one of the above examples of embodiments of the invention, the power control parameters are configured on the basis of a predefined rule (grouping of subframes), then it is possible to implement this in the above signaling design by using the size of the sequence as the group number, wherein the first value is used for group 1 (e.g. fixed subframes), and the second value is used for group 2 (e.g. flexible subframes), etc. It is to be noted that the size is not limit to value of 7.

Regarding the part p0-UE-PUCCHList, this is related to a parameter $P_{O\_UE\_PUCCH}$ used in an equation which may be similar to equation (1) but for PUCCH power control, and which has a unit [dB].

Similar to the above part p0-UE-PUSCHList, when, according to one of the above examples of embodiments of the invention, the power control parameters are configured on the basis of a subframe index, then it is possible to implement this in the above signaling design by using the first value of p0-UE-PUCCHList for subframes SF#0, SF#1, SF#5, SF#6 (fixed subframes in LA TDD), by using the second value thereof for subframe SF#2; by using the third value thereof for subframe SF#3, by using the fourth value thereof for subframe SF#4, by using the fifth value thereof for subframe SF#7, by using the sixth value thereof for subframe SF#8, and by using the seventh value thereof for subframe SF#9. On the other hand, when, according to one of the above examples of embodiments of the invention, the power control parameters are configured on the basis of a predefined rule (grouping of subframes), then it is possible to implement this in the above signaling design by using the size of the sequence as the group number, wherein the first value is used for group 1 (e.g. fixed subframes), and the second value is used for group 2 (e.g. flexible subframes), etc. It is to be noted that the size is not limit to value of 7.

Regarding the part pSRS-OffsetList, this is related to a parameter $P_{SRS\_SRS\_OFFSET}$ used in an equation which may be similar to equation (1) but for SRS power control. For example, according to 3GPP TS 36.213 v.10.2.0 (rel. 11), when a parameter Ks has a value of 1.25, the actual parameter value is pSRS-Offset value−3. For Ks=0, the actual parameter value is −10.5+1.5*pSRS-Offset value.

Similar to the above part p0-UE-PUSCHList, when, according to one of the above examples of embodiments of the invention, the power control parameters are configured on the basis of a subframe index, then it is possible to implement this in the above signaling design by using the first value of pSRS-OffsetList for subframes SF#0, SF#1, SF#5, SF#6 (fixed subframes in LA TDD), by using the second value thereof for subframe SF#2; by using the third value thereof for subframe SF#3, by using the fourth value thereof for subframe SF#4, by using the fifth value thereof for subframe SF#7, by using the sixth value thereof for subframe SF#8, and by using the seventh value thereof for subframe SF#9. On the other hand, when, according to one of the above examples of embodiments of the invention, the power control parameters are configured on the basis of a predefined rule (grouping of subframes), then it is possible to implement this in the above signaling design by using the size of the sequence as the group number, wherein the first value is used for group 1 (e.g. fixed subframes), and the second value is used for group 2 (e.g. flexible subframes), etc. It is to be noted that the size is not limit to value of 7.

In this way, it is possible to configure parameters $P_{O\_UE\_PUSCH}$, $P_{O\_UE\_PUCCH}$ and $P_{SRS\_OFFSET}$ etc. for different subframes/groups.

According to examples of embodiments of the invention, when an UE, such as UE 20 being an LA TDD UE receives the power control parameter set, it applies the PC parameters for each subframe. For example, with regard to the parameter $P_{O\_UE\_PUSCH}$, it is indicated in the RRC signaling of the power control parameter set as indicated above (p0-UE-PUSCHList) that e.g. the following sequence is to be considered: (−8, −4, −2, 3, 5, 6, 7). When there is a PUSCH transmission in subframe SF#3, for example, then the UE determines from the list the value (−2) for $P_{O\_UE\_PUSCH}$ and uses the determined value in the calculation of the PUSCH transmission power in subframe SF#3 by means of the equation (1), for example.

In an alternative example, it is assumed that for example groups of subframes are formed on the basis of a predefined rule, e.g groups according to different kinds of subframe (that is a group 1 for subframes SF#0, SF#1, SF#5, SF#6 which are fixed subframes, and a group 2 for subframes SF#2, SF#3, SF#4, SF#7, SF#8, SF#9 which are flexible subframes). When $P_{O\_UE\_PUSCH}$ is indicated as (−8, 6) in the RRC signaling, and when there is a PUSCH transmission to be conducted in subframe SF#3, then the UE applies (6) for $P_{O\_UE\_PUSCH}$ when calculating the PUSCH transmission power in subframe SF#3 by means of the equation (1), for example.

According to further examples of embodiments of the invention, when the accumulation mode for the adjustment of the transmission power (TPC commands) is enabled for specific subframes, and the TPC related parameter in the power control equation will be updated separately based on different subframe/group that is configured by RRC, the following processing may be conducted.

When considering, for example, the PUSCH power control with accumulation mode enabled, the TPC command related parameter for PUSCH equation is $f_c$, as described above in connection with equation (1). The TPC command related parameter may be updated for example in the following manner:

$$f_c(i) = f_c(i-1) + \delta_{PUSCH,c}(i - K_{PUSCH}) \qquad (2)$$

when TPC command is included in UL grant, otherwise $$f_c(i) = f_c(i-1) \qquad (3).$$

In the equation, $\delta_{PUSCH,c}(i - K_{PUSCH})$ is the TPC command in the related UL grant, which does not need to be changed.

$f_c(i-1)$ is the value in last subframe. According to examples of embodiments, this $f_c(i-1)$ is changed into $f_c(i-n)$, where i-n is the last subframe of a specific kind of subframe with the same $P_O$ value in the RRC configuration (when the power control parameters are configured e.g. on the basis of a predefined rule (grouping of subframes)), or the last subframe of subframes in the same group. For example, if fixed subframes are subframes SF#0, SF#1, SF#5, SF#6, then if i=5, i−n=1. For another example, if flexible subframe with the same $P_O$ value is subframe SF#4, then if i=4, i−n=4 in last radio frame. For the third example, if subframes SF#2, SF#3, SF#4, SF#7, SF#8, SF#9 (which are flexible subframes) are allocated to the same group, then if i=7, i−n=4.

Figure 5:
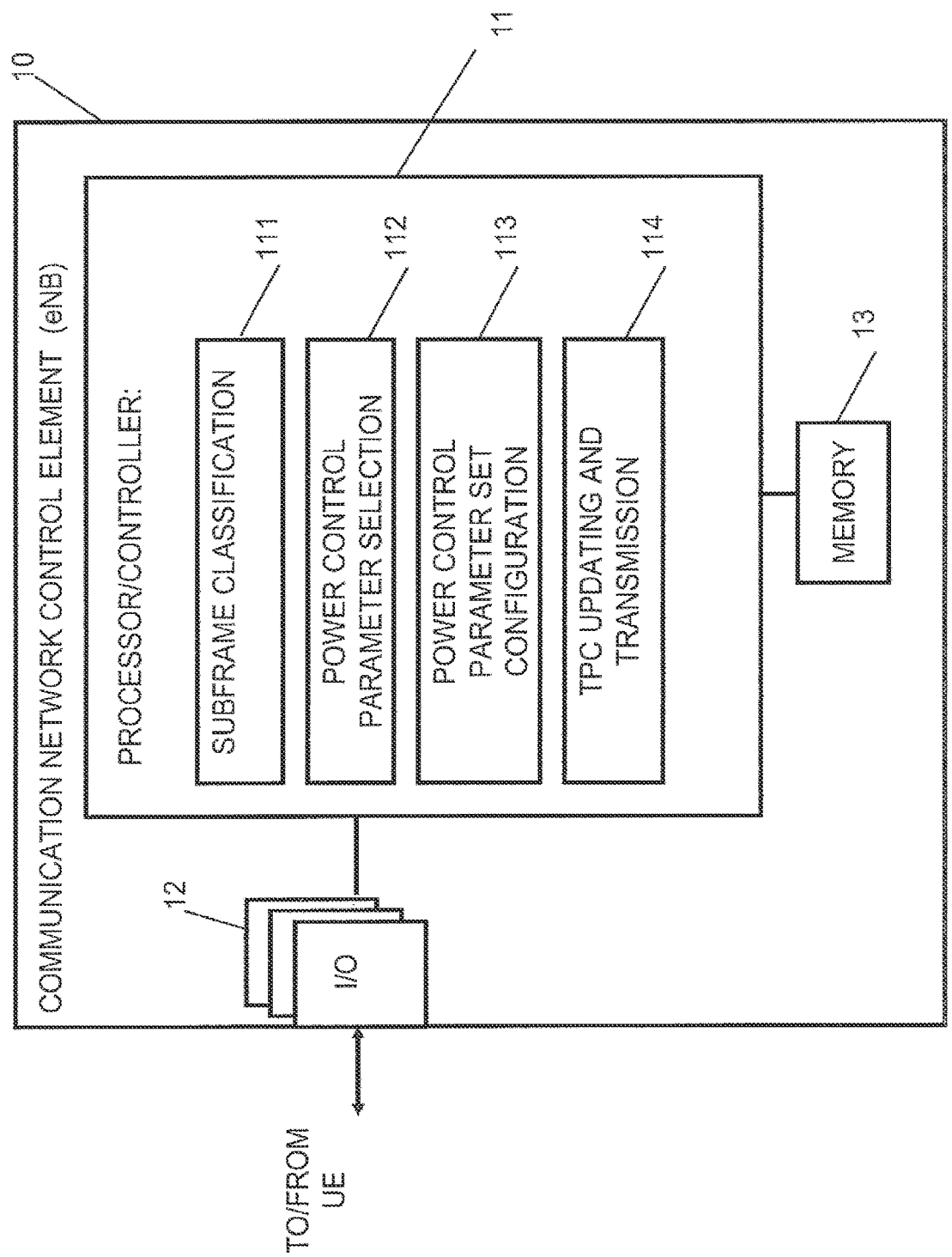
FIG. 5 shows a block circuit diagram of a communication network control element including processing portions conducting functions according to examples of embodiments of the invention.

In FIG. 5, a block circuit diagram illustrating a configuration of a communication network control element, such as the eNB 10, is shown, which is configured to implement functions of the power control procedure and thus of the processing as described in connection with the examples of embodiments of the invention according to FIG. 3, for example. It is to be noted that the communication network control element or eNB 10 shown in FIG. 5 may comprise several further elements or functions besides those described herein below, which are omitted herein for the sake of simplicity as they are not essential for understanding the invention. Furthermore, even though reference is made to an eNB, the communication network element may be also another device having a similar function, such as a modem chipset, a chip, a module etc., which can also be part of a base station or attached as a separate element to a base station, or the like.

The communication network control element or eNB 10 may comprise a processing function or processor 11, such as a CPU or the like, which executes instructions given by programs or the like related to the power control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes interface or transceiver or input/output (I/O) units connected to the processor 11. The I/O units 12 may be used for communicating with elements of the cellular network, such as a communication network element like a UE. The I/O units 12 may be a combined unit comprising communication equipment towards several network elements, or may comprise a distributed structure with a plurality of different interfaces for different network elements. Reference sign 13 denotes a memory usable, for example, for storing data and programs to be executed by the processor 11 and/or as a working storage of the processor 11.

The processor 11 is configured to execute processing related to the above described power control procedure. In particular, the processor 11 comprises a sub-portion 111 as a processing portion which is usable as a subframe classification element which classifies the subframes into the classification sets. The portion 111 may be configured to perform processing according to step S110 according to FIG. 3, for example. Furthermore, the processor 11 comprises a sub-portion 112 as a processing portion which is usable as a power control parameter selection element which is able to select in a suitable manner power control related parameters for the subframes in the classification sets. The portion 112 may be configured, for example, to perform processing according to step S120 according to FIG. 3, for example. Moreover, the processor 11 comprises a sub-portion 113 as a processing portion which is usable as a power control parameter set configuration element which is able to configure a power control parameter set. The portion 113 may be configured, for example, to perform processing according to step S130 according to FIG. 3, for example. In addition, the processor 11 comprises a sub-portion 114 as a processing portion usable as a TPC updating and transmission element which is able to update TPC command values and to transmit them to the UE. The portion 114 may be configured, for example, to perform processing according to step S140 according to FIG. 3, for example.

Figure 6:
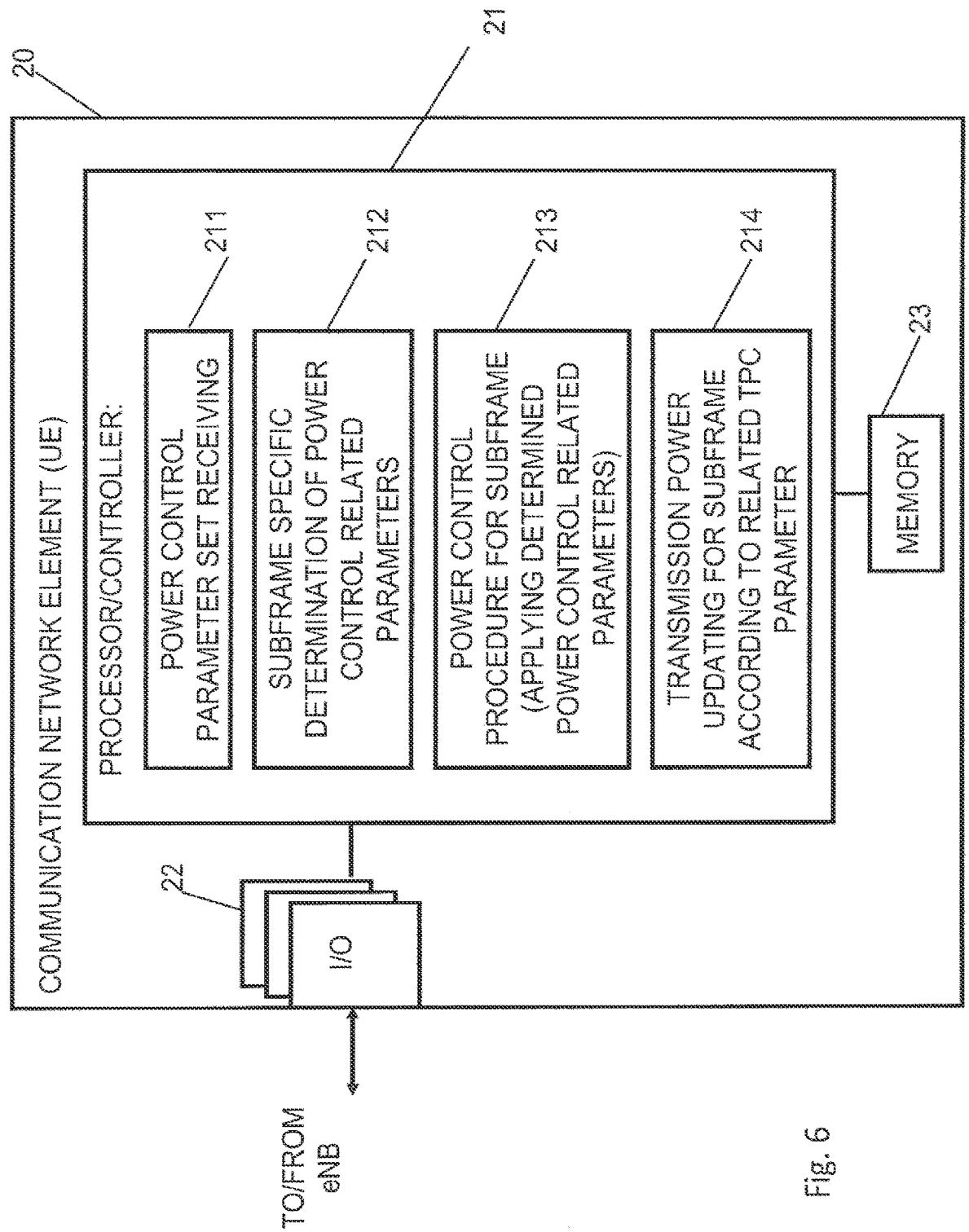
FIG. 6 shows a block circuit diagram of a communication network element including processing portions conducting functions according to examples of embodiments of the invention.

In FIG. 6, a block circuit diagram illustrating a configuration of a communication network element, such as of UE 20, is shown, which is configured to implement the functions of the power control procedure and thus the processing as described in connection with the examples of embodiments of the invention according to FIG. 4, for example. It is to be noted that the communication network element or UE 20 shown in FIG. 6 may comprise several further elements or functions besides those described herein below, which are omitted herein for the sake of simplicity as they are not essential for understanding the invention. Furthermore, even though reference is made to a UE, the communication network element may be also another device having a similar function, such as a modem chipset, a chip, a module etc., which can also be part of a UE or attached as a separate element to a UE, or the like.

The communication network element or UE 20 may comprise a processing function or processor 21, such as a CPU or the like, which executes instructions given by programs or the like related to the power control. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes interfaces or transceivers or input/output (I/O) units connected to the processor 21. The I/O units 22 may be used for communicating with elements of the communication network, such as a communication network control element like an eNB. The I/O units 22 may be a combined unit comprising communication equipment towards several of the network element in question, or may comprise a distributed structure with a plurality of different interfaces for each network element in question. Reference sign 23 denotes a memory usable, for example, for storing data and programs to be executed by the processor 21 and/or as a working storage of the processor 21.

The processor 21 is configured to execute processing related to the above described power control procedure. In particular, the processor 21 comprises a sub-portion 211 as a processing portion which is usable for receiving a power control parameter set from the communication network control element. The portion 211 may be configured to perform processing according to step S210 according to FIG. 4, for example. Furthermore, the processor 21 comprises a sub-portion 212 as a processing portion for determining, for the subframes, power control related parameters from the power control parameter set in accordance with the classification sets of the subframes. The portion 212 may be configured to perform processing according to step S220 according to FIG. 4, for example. Moreover, the processor 21 comprises a sub-portion 213 as a processing portion which is usable for conducting a power control procedure, i.e. for applying the determined power control related parameters for a power control on the respective subframes. The portion 213 may be configured to perform processing according to step S230 according to FIG. 4, for example. In addition, the processor 21 comprises a sub-portion 214 as a processing portion which is usable for updating a transmission power according to received TPC commands in respective subframes, again according to the classification sets of the subframes. The portion 214 may be configured to perform processing according to step S240 according to FIG. 4, for example.

According to further examples of embodiments of the invention, there is provided an apparatus comprising a classifying processing means for classifying subframes of a frame structure of a time division based communication into at least two different classification sets, each classification set comprising at least one subframe, a selecting processing means for selecting separately for each of the at least two classification sets at least one power control related parameter, and a configuration processing means for configuring on the basis of the selected power control related parameters a power control parameter set defining a power control setting for each subframe of the frame structure.

Furthermore, according to a further examples of embodiments of the invention, there is provided an apparatus comprising receiving means for receiving a power control parameter set defining a power control setting for subframe of a frame structure of a time division based communication, determining processing means for determining from the power control parameter set at least one power control related parameter for each subframe, wherein the determination is based on a classification of the subframes into at least two different classification sets, each classification set comprising at least one subframe, and an applying processing means for applying the determined power control related parameter in a power control for a communication in each subframe.

As described above, examples of embodiments of the invention concerning the feedback framework are described to be implemented in UEs and eNBs. However, the invention is not limited to this. For example, examples of embodiments of the invention may be implemented in any wireless modems or the like.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element may be any device, apparatus, unit or means by which a system user or subscriber may experience services from an access network, such as a mobile phone, personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a mechanism for conducting power control in a time division based communication. Subframes of a frame structure of the time division based communication are classified into at two or more classification sets, each classification set comprising at least one subframe. For each of the classification sets, power control related parameters are selected in accordance with the interference on the respective subframes. On the basis of the selected power control related parameters, a power control parameter set is configured defining a power control setting for each subframe of the frame structure. A UE receiving the power control parameter set applies the power control related parameters in the power control.

Although the present invention has been described herein before with reference to particular embodiments thereof, the present invention is not limited thereto and various modifications can be made thereto.

What is claimed is:

1. An apparatus comprising
circuitry configured to:
classify subframes of a frame structure of a time division based communication into at least two different classification sets according to whether a subframe is a fixed subframe or a flexible subframe, the fixed subframe being fixedly preconfigured as one of a downlink subframe or an uplink subframe and the flexible subframe being dynamically assigned to represent an uplink subframe at one time and a downlink subframe at another time,
select separately at least one power control related parameter for each of the subframes, the at least one power control parameter being selected based on the classification of the respective subframe into one of the classification sets according to whether the respective subframe is a fixed subframe or a flexible subframe, wherein the selecting includes selecting the at least one power control related parameter from a first group of power control related parameters when the respective subframe is classified into the classification set corresponding to fixed subframes, and selecting the at least one power control related parameter from a second group of power control related parameters when the respective subframe is classified into the classification set corresponding to flexible subframes, and
configure, on the basis of the selected power control related parameters, a power control setting for each subframe of the frame structure.

2. The apparatus according to claim 1, wherein the at least one power control related parameter from at least one of:
a parameter related to a power control for an uplink shared channel,
a parameter related to a power control for an uplink control channel,
a parameter related to a power control for a sounding reference signaling, and
a setting parameter for enabling or disabling a processing mode for accumulating transmission power control command values.

3. The apparatus of claim 1, wherein the circuitry is further configured to sequence the power control related parameters in an order corresponding to the at least two classification sets for configuring the power control parameter set.

4. The apparatus according to claim 1, wherein the circuitry is further configured to update a transmission power control command value according to the classification sets.

5. The apparatus according to claim 1, wherein the circuitry is further configured to send the power control parameter set to a communication network element.

6. A method, implemented by an apparatus, comprising
classifying, by circuitry of the apparatus, subframes of a frame structure of a time division based communication into at least two different classification sets according to whether a subframe is a fixed subframe or a flexible subframe, the fixed subframe being fixedly preconfigured as one of a downlink subframe or an uplink subframe and the flexible subframe being dynamically assigned to represent an uplink subframe at one time and a downlink subframe at another time;
selecting separately at least one power control related parameter for each of the subframes, the at least one power control parameter being selected based on the classification of the respective subframe into one of the classification sets according to whether the respective subframe is a fixed subframe or a flexible subframe, wherein the selecting includes selecting the at least one power control related parameter from a first group of power control related parameters when the respective subframe is classified into the classification set corresponding to fixed subframes, and selecting the at least one power control related parameter from a second group of power control related parameters when the respective subframe is classified into the classification set corresponding to flexible subframes, and
configuring, on the basis of the selected power control related parameters, a power control setting for each subframe of the frame structure.

7. The method according to claim 6, further comprising selecting the at least one power control related parameter from at least one of:
a parameter related to a power control for an uplink shared channel,
a parameter related to a power control for an uplink control channel,
a parameter related to a power control for a sounding reference signaling, and
a setting parameter for enabling or disabling a processing mode for accumulating transmission power control command values.

8. The method according to claim 6, further comprising sequencing the power control related parameters in an order corresponding to the at least two classification sets for configuring the power control parameter set.

9. The method according to claim 6, wherein further comprising updating a transmission power control command value according to the classification sets.

10. The method according to claim 6, further comprising sending the power control parameter set to a communication network element.

11. The apparatus according to claim 1, wherein the first group of power control related parameters are different from the second group of power control related parameters.

12. The apparatus according to claim 11, wherein the power control related parameters in each of the first group of power control related parameters and the second group of power control related parameters are values corresponding to each of a plurality of power control settings.

13. An apparatus comprising
circuitry configured to:
receive a power control parameter set defining a power control setting for each subframe of a frame structure of a time division based communication,
determine from the power control parameter set at least one power control related parameter for each subframe, wherein the determination is based on a classification of the subframes into at least two different classification sets according to whether a subframe is a fixed subframe or a flexible subframe, the fixed subframe being fixedly preconfigured as one of a downlink subframe or an uplink subframe and the flexible subframe being dynamically assigned to represent an uplink subframe at one time and a downlink subframe at another time, wherein the at least one power control related parameter is set from a first group of power control related parameters when the respective subframe is classified into the classification set corresponding to fixed subframes, and the at least one power control related parameter is set from a second group of power control related parameters when the respective subframe is classified into the classification set corresponding to flexible subframes, and
apply the determined power control related parameter in a power control for a communication in each subframe.

14. The apparatus according to claim 13, wherein the at least one power control related parameter is at least one of:
a parameter related to a power control for an uplink shared channel,
a parameter related to a power control for an uplink control channel,
a parameter related to a power control for a sounding reference signaling, and
a setting parameter for enabling or disabling a processing mode for accumulating transmission power control command values.

15. The apparatus according to claim 13, wherein the at least one power control related parameter is set on the basis of an interference level in a communication in the respective subframe.

16. The apparatus according to claim 13, wherein the circuitry is further configured to determine the at least one power control related parameter from the power control parameter set on the basis of a sequence comprising the power control related parameters in an order corresponding to the at least two classification sets.

17. The apparatus according to claim 13, wherein the circuitry is further configured to:
receive an update for a transmission power control command value according to the classification sets, and
determine from the received update for the transmission power control command value a change amount for a transmission power of a respective subframe on the basis of the classification of the subframes into the at least two different classification sets.

18. The apparatus according to claim 1, wherein the circuitry is further configured to select the at least one power control related parameter from at least one of:
a parameter related to a power control for an uplink control channel, a parameter related to a power control for a sounding reference signaling, and a setting parameter for enabling or disabling a processing mode for accumulating transmission power control command values.

\* \* \* \* \*